(12) United States Patent
Shiraki et al.

(10) Patent No.: US 10,749,202 B2
(45) Date of Patent: Aug. 18, 2020

(54) REDOX FLOW BATTERY

(71) Applicant: Sumitomo Electric Industries, Ltd., Osaka-shi (JP)

(72) Inventors: Kousuke Shiraki, Osaka (JP); Takashi Kanno, Osaka (JP); Haruhisa Toyoda, Osaka (JP); Takefumi Ito, Osaka (JP); Masahiro Kuwabara, Osaka (JP); Hideyuki Yamaguchi, Osaka (JP); Hayato Fujita, Osaka (JP); Kiyoaki Hayashi, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/080,699

(22) PCT Filed: Jan. 25, 2017

(86) PCT No.: PCT/JP2017/002430
§ 371 (c)(1),
(2) Date: Aug. 29, 2018

(87) PCT Pub. No.: WO2017/150011
PCT Pub. Date: Sep. 8, 2017

(65) Prior Publication Data
US 2019/0067726 A1 Feb. 28, 2019

(30) Foreign Application Priority Data
Feb. 29, 2016 (JP) .................. 2016-038080

(51) Int. Cl.
*H01M 8/18* (2006.01)
*H01M 8/0271* (2016.01)
(Continued)

(52) U.S. Cl.
CPC ......... *H01M 8/188* (2013.01); *H01M 8/0271* (2013.01); *H01M 8/0273* (2013.01);
(Continued)

(58) Field of Classification Search
CPC ....................................................... H01M 8/188
See application file for complete search history.

(56) References Cited

U.S. PATENT DOCUMENTS 9,196,910 B2 * 11/2015 Yamauchi ........... H01M 8/0273
2004/0170893 A1 9/2004 Nakaishi et al.
2015/0017568 A1 1/2015 Kim et al.

FOREIGN PATENT DOCUMENTS

CN 103840180 A 6/2014
EP 2919309 A1 9/2015
(Continued)

Primary Examiner — Ula C Ruddock
Assistant Examiner — Thomas H. Parsons
(74) Attorney, Agent, or Firm — Baker Botts L.L.P.; Michael A. Sartori

(57) ABSTRACT

A redox flow battery includes a cell frame having a frame body in which a sealing groove is formed and a sealing member disposed in the sealing groove. The redox flow battery includes an adhesive that fixes the sealing member to the sealing groove, and a type A durometer hardness of the adhesive after curing is 100 or less. Preferably, the type A durometer hardness of the adhesive after curing is less than or equal to a type A durometer hardness of the sealing member.

9 Claims, 5 Drawing Sheets

(51) Int. Cl.
*H01M 8/0273* (2016.01)
*H01M 8/0276* (2016.01)
*H01M 8/0289* (2016.01)

(52) U.S. Cl.
CPC ....... *H01M 8/0278* (2013.01); *H01M 8/0289* (2013.01); *H01M 8/18* (2013.01); *Y02E 60/528* (2013.01)

(56) References Cited

FOREIGN PATENT DOCUMENTS

| | | | |
|---|---|---|---|
| JP | 2000-156234 A | | 6/2000 |
| JP | 2002-367659 A | | 12/2002 |
| JP | 2007262261 | * | 10/2007 |
| JP | 2007262261 A | * | 10/2007 |
| JP | 2012-099368 A | | 5/2012 |
| JP | 201299368 | * | 5/2012 |
| WO | 02/101864 A1 | | 12/2002 |

\* cited by examiner

REDOX FLOW BATTERY

TECHNICAL FIELD

The present invention relates to a redox flow battery.

The present application claims priority based on Japanese Patent Application No. 2016-038080 filed on Feb. 29, 2016, the entire contents of which are incorporated herein.

BACKGROUND ART

In a redox flow battery (RF battery) described in PTL 1, inner sealing grooves and outer sealing grooves are formed in both surfaces of a frame (frame body) at positions where the inner sealing grooves and the outer sealing grooves respectively face each other, and inner seals and outer seals are respectively disposed in the inner sealing grooves and the outer sealing grooves. O-rings are used as the inner seals and outer seals. By pressing a stack of cell frames by fastening end plates that sandwich the stack of cell frames from both sides thereof, the inner seals and the outer seals press-contact a membrane, and thereby leakage of an electrolyte of a cell from a space between the frames is prevented.

CITATION LIST

Patent Literature

PTL 1: Japanese Unexamined Patent Application Publication No. 2002-367659

SUMMARY OF INVENTION

A redox flow battery according to an aspect of the present invention includes a cell frame having a frame body in which a sealing groove is formed and a sealing member disposed in the sealing groove. The redox flow battery includes an adhesive that fixes the sealing member to the sealing groove, and a type A durometer hardness of the adhesive after curing is 100 or less.

DESCRIPTION OF EMBODIMENTS

Figure 4:
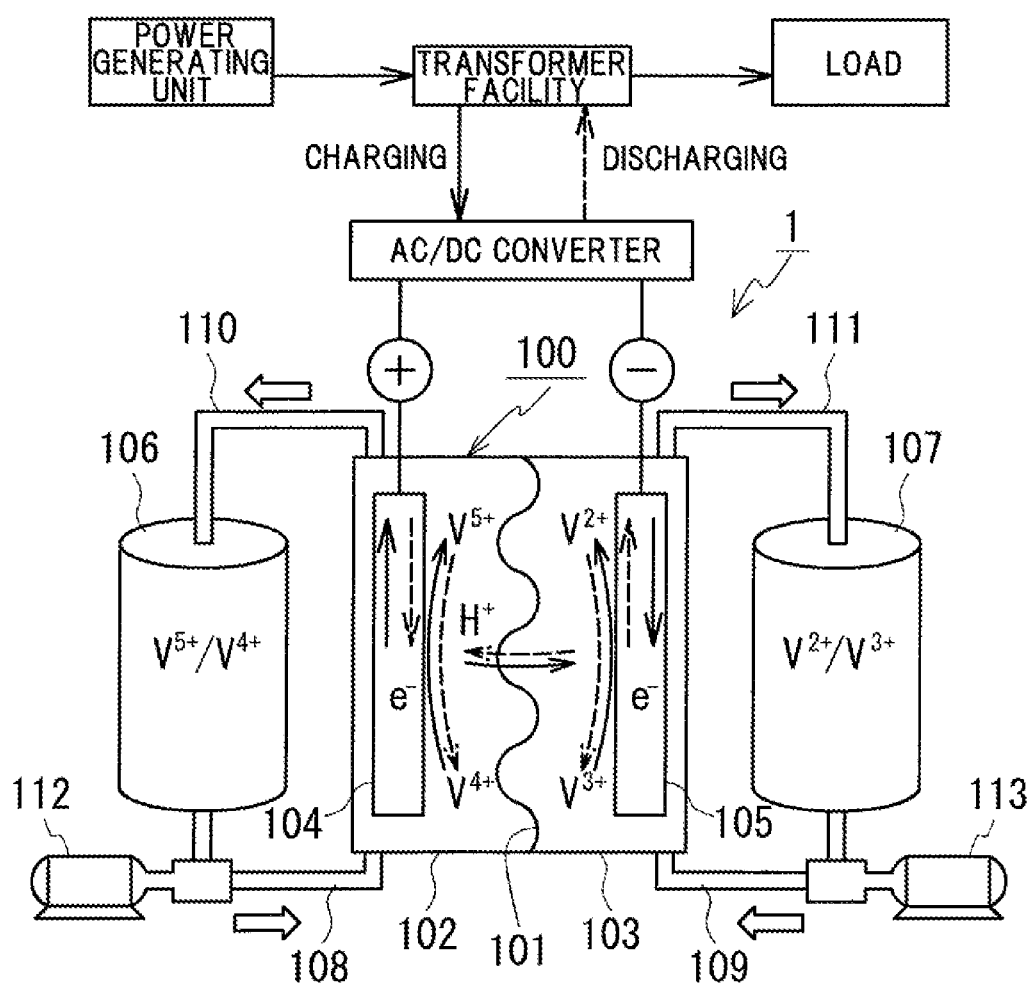
FIG. 4 is a diagram showing the operating principle of a redox flow battery.

A redox flow battery (RF battery) is an example of a large-capacity storage battery for storing electric power derived from natural energy by solar photovoltaic power generation, wind power generation, or the like. As shown in FIG. 4, which is a diagram showing the operation principle of a RF battery, typically, a RF battery 1 is connected between a power generation unit (such as a solar photovoltaic power generator, a wind power generator, a general power station, or the like) and a load (such as a user) via an AC/DC converter. The RF battery 1 stores electric power generated by the power generation unit by being charged, and supplies the stored electric power to the load by being discharged.

The RF battery 1 includes a battery cell 100, which is separated into a positive electrode cell 102 and a negative electrode cell 103 by a membrane 101 that allows hydrogen ions to pass therethrough. A positive electrode 104 is disposed in the positive electrode cell 102; and a positive electrolyte tank 106, which stores a positive electrolyte, is connected to the positive electrode cell 102 via a supply conduit 108 and a discharge conduit 110. Likewise, a negative electrode 105 is disposed in the negative electrode cell 103; and a negative electrolyte tank 107, which stores a negative electrolyte, is connected to the negative electrode cell 103 via a supply conduit 109 and a discharge conduit 111. The positive and negative electrolytes are supplied from the supply conduits 108 and 109 to the electrode cells 102 and 103 by pumps 112 and 113, which are disposed in the supply conduits 108 and 109; made to flow from the electrode cells 102 and 103 through the discharge conduits 110 and 111; discharged to the positive and negative electrode tanks 106 and 107; and thereby circulated to the electrode cells 102 and 103. The RF battery 1 is charged and discharged by circulating the electrolytes in this way and by using a difference in oxidation-reduction potential between ions included in the positive electrolyte and ions included in the negative electrolyte. In FIG. 4, vanadium ions are shown as ions included in the positive and negative electrolytes, and solid-line arrows represent charging and broken-line arrows represent discharging.

Figure 5:
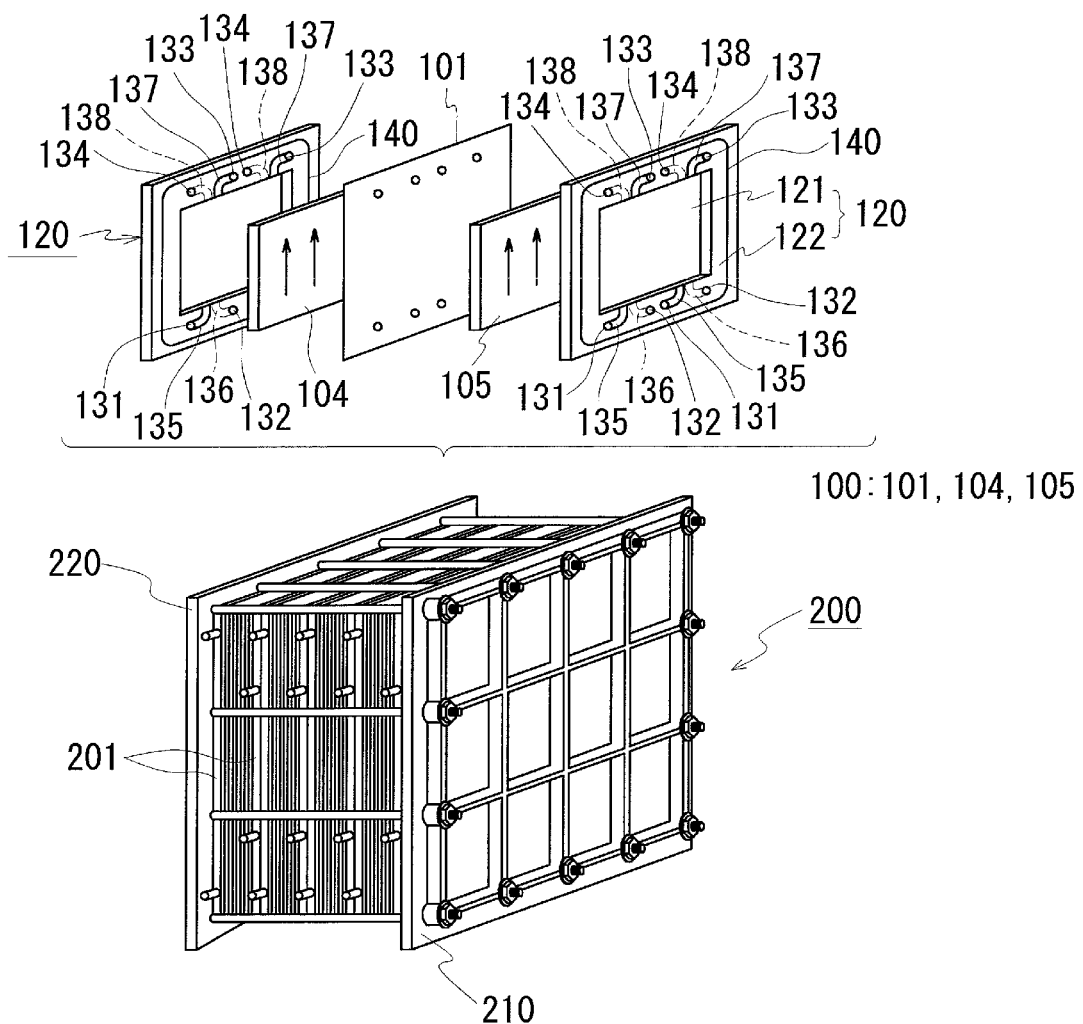
FIG. 5 schematically illustrates a cell stack included in a redox flow battery.

The battery cell 100 is usually formed in a structure called a cell stack 200, which is illustrated in the lower figure of FIG. 5. The cell stack 200 is fastened with a fastening mechanism by clamping the cell stack 200 from both sides thereof between two end plates 210 and 220. As illustrated in the upper figure of FIG. 5, the cell stack 200 includes a layered body that is formed by stacking a cell frame 120, the positive electrode 104, the membrane 101, and the negative electrode 105 in this order; and a pair of supply/discharge plates 201 (the lower figure of FIG. 5) disposed on both sides of the layered body. The cell frame 120 includes a bipolar plate 121 and a frame body 122, which surrounds the peripheral edge of the bipolar plate 121. In this structure, one battery cell 100 is formed between bipolar plates 121 of adjacent cell frames 120, and the positive electrode 104 (the positive electrode cell 102) and the negative electrode 105 (the negative electrode cell 103) of adjacent battery cells 100 are disposed on the front and back sides of a bipolar plate 121. The supply/discharge plates 201 allow the electrolytes to flow between the cell stack 200 and the tanks 106 and 107.

The positive and negative electrolytes flow in the battery cell 100 via liquid supply manifolds 131 and 132 and liquid discharge manifolds 133 and 134, which are formed in the frame body 122. The positive electrolyte is supplied from the liquid supply manifolds 131 to the positive electrode 104 via liquid-supply guide grooves 135, which are formed in a first surface (on the front side of the sheet) of the frame body 122. Then, as shown by arrows in the upper figure of FIG. 5, the positive electrolyte flows upward along the positive electrode 104, and is discharged to the liquid discharge manifolds 133 via liquid-discharge guide grooves 137 formed in the frame body 122. Likewise, the negative electrolyte is supplied from the liquid supply manifolds 132 to the negative electrode 105 via liquid-supply guide grooves 136, which are formed in a second surface (on the back side of the sheet) of the frame body 122. Then, the negative electrolyte flows upward along the negative electrode 105, and is discharged to the liquid discharge manifolds 134 via liquid-discharge guide grooves 138 formed in the frame body 122. A ring-shaped sealing member 140, such as an O-ring, is disposed between frame bodies 122, and suppresses leakage of an electrolyte from the battery cell 100.

Problems to be Solved by the Present Disclosure

It is desirable to facilitate forming of an electrolyte sealing structure and to improve electrolyte sealability. Because a sealing member made of an elastic material, such as an O-ring, is a soft and long string whose shape is not definite, the O-ring may come off a sealing groove even if the O-ring is fitted into the sealing groove. In particular, the sealing member may become displaced and come off the sealing groove due to, for example, contact with an adjacent cell frame or a sealing member of the adjacent cell frame when the cell frames are stacked. When a cell stack is assembled in a state in which the sealing member has come off the sealing groove, an electrolyte may easily leak to the outside of the frame body of the cell frame.

In view of the above circumstances, it is an object to provide a redox flow battery that facilitates forming of an electrolyte sealing structure and that has high electrolyte sealability.

Advantageous Effects of the Present Disclosure

With the present disclosure, it is possible to provide a redox flow battery that facilitates forming of an electrolyte sealing structure and that has high electrolyte sealability.

DESCRIPTION OF EMBODIMENTS OF PRESENT INVENTION

First, the contents of embodiments of the present invention will be enumerated and described.

(1) A redox flow battery according to an aspect of the present invention includes a cell frame having a frame body in which a sealing groove is formed and a sealing member disposed in the sealing groove. The redox flow battery includes an adhesive that fixes the sealing member to the sealing groove, and a type A durometer hardness of the adhesive after curing is 100 or less.

With the structure described above, it is easy to form an electrolyte sealing structure. This is because, since the sealing member can be fixed to the sealing groove with the adhesive, even when an O-ring, which is a soft and long strip whose shape is not definite, is used as the sealing member, it is easy to suppress coming off of the sealing member, which is fitted into the sealing groove, from the sealing groove. Note that the term "curing" of the adhesive includes "solidifying" of the adhesive.

With the structure described above, electrolyte sealability is high.

Before curing, the adhesive has high fluidity. Therefore, when the adhesive before curing is applied to the sealing groove and the sealing member is made to contact the adhesive before curing, it is easy for the adhesive to flow so that a gap may not be formed between the inside of the sealing groove and the sealing member. Moreover, it is easy to suppress forming of a gap that extends through the adhesive from the inside of the frame body to the outside of the frame body, which may occur due to contact between the adhesive and the sealing member. Accordingly, it is possible to suppress leakage of an electrolyte to the outside of the frame body after curing the adhesive.

The adhesive after curing has a type A durometer hardness of 100 or less and is soft. Therefore, when the cell frames are stacked after curing the adhesive and thereby fixing the sealing member to the sealing groove, even if the sealing member deforms by being compressed by an adjacent cell frame or a sealing member of the adjacent cell frame, the adhesive after curing can deform in accordance with the deformation of the sealing member. Thus, it is easy to suppress damage to the adhesive due to the deformation of the sealing member, and it is easy to suppress detachment of the sealing member from the adhesive and detachment of the adhesive from the sealing groove. Accordingly, it is easy to suppress coming off of the sealing member from the sealing groove, and therefore it is possible to suppress leakage of an electrolyte to the outside of the frame body.

The adhesive can have a function of sealing the electrolyte because damage to the adhesive can be suppressed, and therefore it is easy to increase electrolyte sealability.

(2) As an embodiment of the redox flow battery, the type A durometer hardness of the adhesive after curing is less than or equal to a type A durometer hardness of the sealing member.

With the structure described above, it is easier to suppress damage to the adhesive due to deformation of the sealing member. This is because the adhesive can easily deform in accordance with the deformation of the sealing member, since the adhesive is as soft as the sealing member or softer than the sealing member.

(3) As an embodiment of the redox flow battery, a material of the adhesive is at least one material selected from a silicone resin adhesive, an epoxy resin adhesive, a polyurethane adhesive, an acrylic adhesive, a vinyl acetate adhesive, a vinyl chloride adhesive, and a latex adhesive.

With the structure described above, it is easy to suppress decrease of battery performance. This is because, since each of the materials described above has high electrolyte resistance, it is easy to suppress dissolving of the adhesive in the electrolyte and entry of the adhesive into the frame body as an impurity. Therefore, it is possible to suppress an increase in internal resistance and an increase in pressure loss due to adhesion of an impurity to the electrodes.

(4) As an embodiment of the redox flow battery, a volume occupancy ratio $\{(Vb/Vg) \times 100\}\%$ of the adhesive in the sealing groove is $\{(1-Vs/Vg) \times 50\}\%$ or more and $\{(1-Vs/Vg) \times 100\}\%$ or less, where Vg (mm$^3$) is a volume of the sealing groove, Vs (mm$^3$) is a volume of the sealing member, and Vb (mm$^3$) is a volume of the adhesive.

When the volume occupancy ratio $\{(Vb/Vg) \times 100\}\%$ is $\{(1-Vs/Vg) \times 50\}\%$ or more, the proportion of the adhesive is high, and therefore it is easy to fix the sealing member along the entire length of the sealing groove. Therefore, it is easier to prevent leakage of an electrolyte along the entire length of the frame body. When the volume occupancy ratio $\{(Vb/Vg) \times 100\}\%$ is $\{(1-Vs/Vg) \times 100\}\%$ or less, the proportion of the adhesive is not excessively high, and therefore it is possible to suppress application of an excessive pressure to the adhesive when the sealing member is compressed. Therefore, it is easy to suppress compression breakage of the adhesive after curing. Moreover, it is easy to prevent compression breakage of the sealing member and rapid deterioration of the sealing member due to excessive compression. Furthermore, it is also possible to suppress application of an excessive pressure to the sealing groove when the sealing member is compressed, and therefore it is also easy to prevent compression breakage of the sealing groove itself.

Details of Embodiments of Present Invention

The details of embodiments of the present invention will be described below with reference to the drawings. Note that the present invention is not limited to these examples, and it is intended that the present invention encompasses all modifications within the scope of the claims and the equivalents thereof.

First Embodiment

[Redox Flow Battery]

As with an existing RF battery described with reference to FIGS. 4 and 5, a RF battery according to a first embodiment includes a cell stack 200 including a layered body of a cell frame and a battery cell 100, a positive electrolyte tank 106 that stores a positive electrolyte to be circulated to the positive electrode cell 102 of the battery cell 100, and a negative electrolyte tank 107 that stores a negative electrolyte to be circulated to the negative electrode cell 103. Circulation of the positive and negative electrolytes is performed via supply conduits 108 and 109 and discharge conduits 110 and 111 by pumps 112 and 113 disposed therein.

The main feature of the RF battery according to the first embodiment is that the RF battery of the first embodiment includes an adhesive 6 (the inside of a chain-line circle of FIG. 1, FIG. 2) that fixes a sealing member 5 to a sealing groove 48 of a cell frame 2. As the adhesive 6, a specific adhesive, that is, an adhesive having a type A durometer hardness of 100 or less after curing is used.

Hereinafter, details will be described. In the figures, the same numeral presents the same-named object.

[Cell Frame]

The cell frame 2 includes a bipolar plate 3 and a frame body 4 that surrounds the peripheral edge of the bipolar plate 3. There are two types of cell frames 2, one of which is an intermediate cell frame that is disposed between adjacent battery cells 100 (FIG. 5) of the layered body and the other of which is an end cell frame that is disposed at each end of the layered body. For the intermediate cell frame, the positive electrode 104 of one of the battery cells 100 and the negative electrode 105 of the other battery cell 100 contact the front surface and the back surface of the bipolar plate 3. For the end cell frame, one of positive and negative electrodes of the battery cell 100 contacts one of the surfaces of the bipolar plate 3. The configurations of the front and back surfaces (the positive-electrode side and the negative-electrode side) of the cell frame 2 are the same for the intermediate cell frame and the end cell frame.

(Bipolar Plate)

In principle, the bipolar plate 3 separates adjacent battery cells 100 (FIGS. 4 and 5). The bipolar plate 3 is in contact with an electrode of the battery cell 100. The shape of the bipolar plate 3 is a rectangular plate. As the material of the bipolar plate 3, it is possible to use a material that conducts an electric current but does not allow an electrolyte to pass therethrough. In addition, the material has acid resistance and appropriate rigidity. For example, the material of the bipolar plate 3 is an electroconductive plastic composed of graphite and a polyolefin organic compound or a chlorinated organic compound. The material may be an electroconductive plastic that is made by replacing a part of graphite with at least one of carbon black and diamond-like carbon. Examples of a polyolefin organic compound include polyethylene, polypropylene, and polybutene. Examples of a chlorinated organic compound include vinyl chloride, chlorinated polyethylene, and chlorinated paraffin. By forming the bipolar plate 3 from such a material, the bipolar plate 3 can have low electrical resistance and high acid resistance.

(Frame Body)

Inside the frame body 4, a region that serves as the battery cell 100 (FIGS. 4 and 5) is formed. The frame body 4 includes a liquid-supply-side piece 41, which has liquid supply manifolds 44 that supply an electrolyte into the battery cell 100; and a liquid-discharge-side piece 42, which faces the liquid-supply-side piece 41 and which has liquid discharge manifolds 45 that discharge the electrolyte to the outside of the battery cell 100. End portions of the liquid-supply-side piece 41 and the liquid-discharge-side piece 42 are coupled to each other via a pair of coupling pieces 43, which face each other and which are perpendicular to the liquid-supply-side piece 41 and the liquid-discharge-side piece 42. The shape of the frame body 4 is a rectangular frame. The liquid-supply-side piece 41 and the liquid-discharge-side piece 42 form long sides of the rectangular frame, and the coupling pieces 43 form short sides of the rectangular frame. In plan view of the cell frame 2, when the direction in which the liquid-supply-side piece 41 and the liquid-discharge-side piece 42 face each other is defined as the vertical direction and the direction perpendicular to the vertical direction is defined as the horizontal direction, the liquid-supply-side piece 41 is located on the lower side in the vertical direction and the liquid-discharge-side piece 42 is located on the upper side in the vertical direction. That is, the direction of flow of an electrolyte is a direction from the lower side in the vertical direction toward the upper side in the vertical direction of the frame body 4.

The material of the frame body 4 is, for example, a material that satisfies acid resistance, electrical insulation, and mechanical characteristics. Examples of the material of the frame body 4 include various fluororesins such as polytetrafluoroethylene, a polypropylene resin, a polyethylene resin, and a vinyl chloride resin. Here, the material of the frame body 4 is a rigid vinyl chloride resin.

The sealing groove 48 is formed in a peripheral edge portion of the frame body 4 outside of both of the manifolds 44 and 45.

<Sealing Groove>

The sealing member 5 described below (the inside of a chain-line circle of FIG. 1, FIG. 2) is fitted into the sealing groove 48. The sealing groove 48 may be formed in each of the surfaces of the frame body 4 or may be formed only in a first surface (on the front side of the sheet of FIG. 1) and not in a second surface (on the back side of the sheet of FIG. 1). When the sealing groove 48 is formed in each of the surfaces, when the cell frames 2 are stacked, the sealing member 5 in the sealing groove 48 is pressed by a sealing member that is fitted into the sealing groove in the second surface of the frame body of an adjacent cell frame and seals the space between the cell frames. In this case, a membrane 101 (FIGS. 4 and 5) is sandwiched between the sealing members. When the sealing groove 48 is formed in the first surface of the frame body and is not formed in the second surface of the frame body, when the cell frames 2 are stacked, the sealing member 5 in the sealing groove 48 is pressed by the second surface of the frame body of the adjacent cell frame and seals the space between the cell frames. In this case, the membrane 101 (FIGS. 4 and 5) is sandwiched between the sealing member 5 and the frame body of the adjacent cell frame. Here, the sealing groove 48 is formed in the first surface of the frame body 4 (on the front side of the sheet of FIG. 1) and in not formed in the second surface of the frame body 4 (on the back side of the sheet of FIG. 1). The sealing groove 48 has a single structure. However, the sealing groove 48 may have a dual structure including an inner sealing groove and an outer sealing groove.

The sealing groove 48 has a ring-shape extending along the outer shape of the frame body 4 (along the long sides of the pieces 41, 42, and 43). The sealing groove 48 is composed of long linear portions 48L, which are formed in the liquid-supply-side piece 41 and the liquid-discharge-side piece 42 and which are linear in the longitudinal direction of the sealing groove 48; short linear portions 48S, which are formed in the coupling pieces 43 and which are linear in the longitudinal direction of the sealing groove 48; and curved portions 48C, which are formed at the corners of the frame body 4, which couple the long linear portions 48L and the short linear portions 48S to each other, and which are curved in the longitudinal direction of the sealing groove 48.

The cross-sectional shape of the sealing groove 48 is a rectangular shape that is uniform in the longitudinal direction thereof. The width of the sealing groove 48 is uniform in the depth direction thereof.

The width of the sealing groove 48 may be greater than or equal to the diameter D (mm) of the sealing member 5 when the sealing member 5 is not compressed. That is, when the sealing member 5 is not compressed, a gap is formed between the sealing groove 48 and the sealing member 5. In this case, it is easy to place the adhesive 6 described below (the inside of a chain-line circle of FIG. 1, FIG. 2) in the sealing groove 48, and it is easy to fit the sealing member 5 into the sealing groove 48. The width of the sealing groove 48, which may differ in accordance with the depth of the sealing groove 48, may be a width such that the sealing member 5 contacts a side wall of the sealing groove 48 or a width such that a gap is formed between the sealing groove 48 and the sealing member 5, when the sealing member 5 is compressed.

Figure 2:
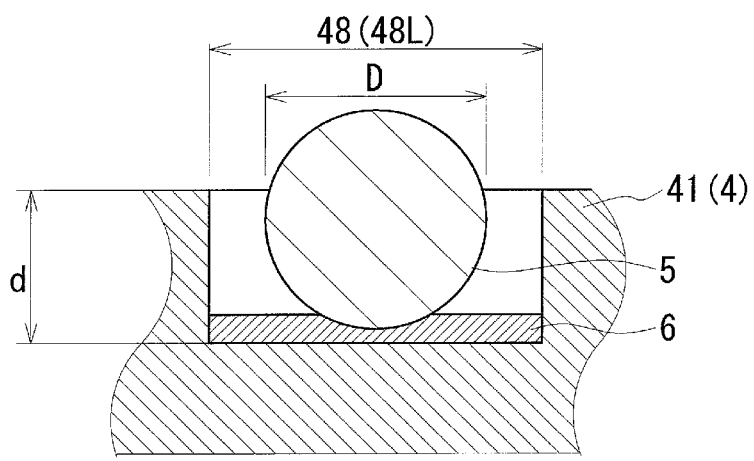
FIG. 2 is a sectional view of a sealing groove of the cell frame illustrated in FIG. 1, taken along sectional line (II)-(II).

Preferably, the depth d (mm) of the sealing groove 48, which may differ in accordance with the material of the sealing member 5, is 0.5D or more (FIG. 2). When the depth d of the sealing groove 48 is 0.5D or more, a region of the sealing member 5 exposed from the sealing groove 48 is not too large, and therefore it is easy to prevent compression breakage of the sealing member 5 due to an adjacent cell frame or a sealing member of the adjacent cell frame (hereinafter, referred to as the adjacent member). More preferably, the depth d of the sealing groove 48 is 0.6D or more.

Preferably, the depth d of the sealing groove 48, which may differ in accordance with the material of the sealing member 5, is 0.9D or less. When the depth d of the sealing groove 48 is 0.9D or less, a region of the sealing member 5 that is exposed from the sealing groove 48 has an appropriate size, and it is easy to sufficiently compress the sealing member 5 with the adjacent member. More preferably, the depth d of the sealing groove 48 is 0.8D or less.

[Sealing Member]

Figure 1:
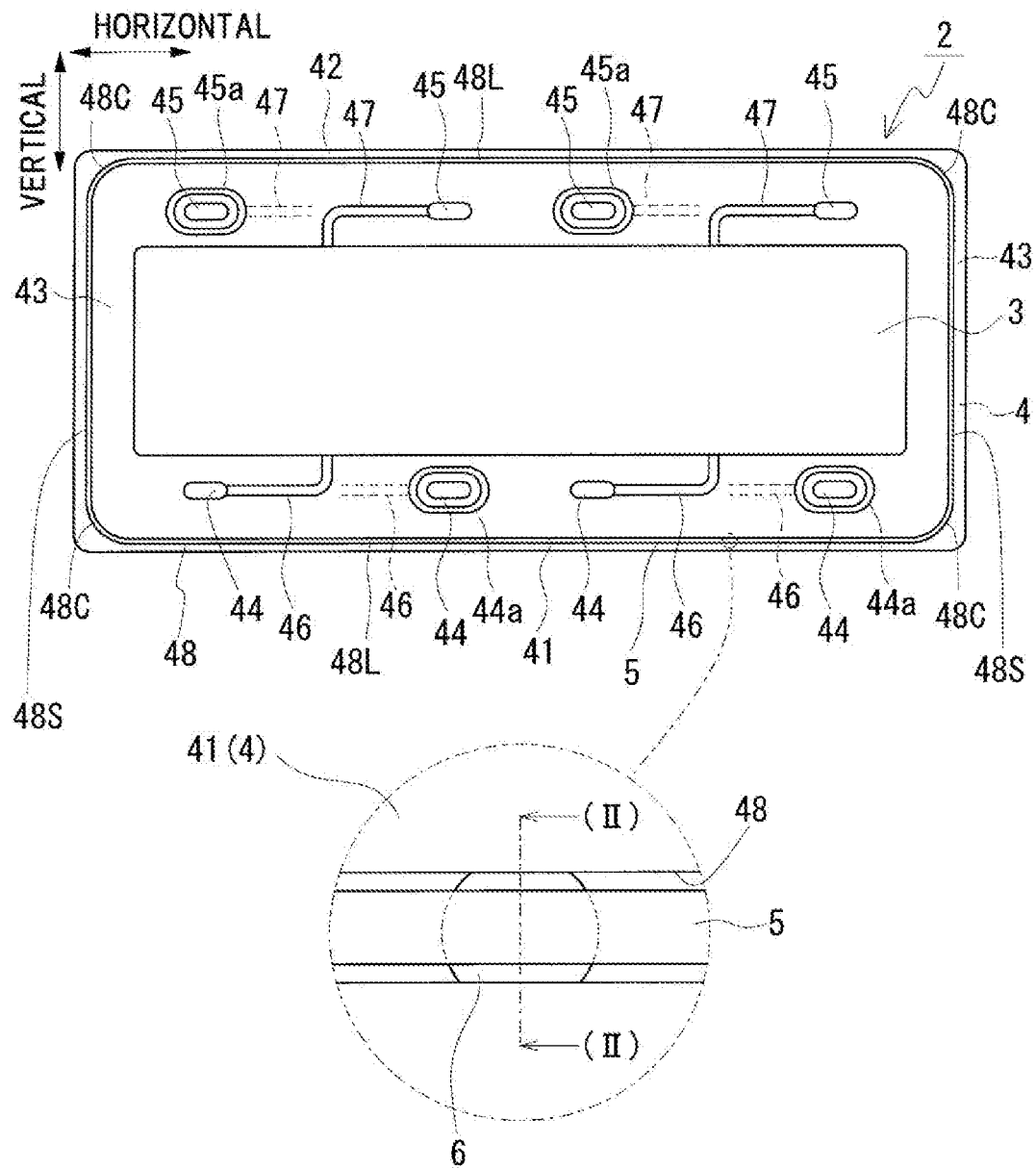
FIG. 1 is a schematic plan view of a cell frame included in a redox flow battery according to a first embodiment.

The sealing member 5 prevents leakage of an electrolyte, which has been supplied to the battery cell 100 (FIGS. 4 and 5), to the outside of the frame body 4 (the enlarged view of FIG. 1). To be specific, when the sealing member 5 is placed in the sealing groove 48 and the cell frames 2 are stacked as described above, the sealing member 5 is pressed by a sealing member fitted into a sealing groove in a second surface of a frame body of an adjacent cell frame or the second surface of the frame body of the adjacent cell frame, and the sealing member 5 elastically deforms and seals the space between the cell frames 2.

As the sealing member 5, an O-ring can be used. The cross-sectional shape of the sealing member 5 is a circular shape when the sealing member 5 is not compressed. When the sealing member 5 is fitted into the sealing groove 48, the cross-sectional shape of the sealing member 5 is a circular shape similar to that when the sealing member 5 is not compressed.

The material of the sealing member 5 is, for example, an elastic material having high acid resistance. Preferably, the material is a rubber, such as an ethylene-propylene-diene monomer rubber (EPDM), a fluorocarbon rubber, or a silicone rubber. The type A durometer hardness of the sealing member 5 may be, for example, 90 or less. When the type A durometer hardness of the sealing member 5 is 90 or less, the sealing member 5 is soft, and therefore it is easy to seal the space between the cell frames 2 by elastically deforming the sealing member 5. The type A durometer hardness of the sealing member 5 may be, for example, 50 or more. When the type A durometer hardness of the sealing member 5 is 50 or more, the sealing member 5 is not too soft and has an appropriate elasticity, and therefore it is easy to keep the sealability of the space between the cell frames 2 when the sealing member 5 is compressed by the adjacent member. Type A durometer hardness is measured in accordance with "Rubber, vulcanized or thermoplastic—Determination of hardness—Part 3: Durometer method MS K 6253-3 (2012)". The same applies to the type A durometer hardness of the adhesive 6 described below.

[Adhesive]

The adhesive 6 fixes the sealing member 5 to the sealing groove 48 (the inside of a chain-line circle of FIG. 1, FIG. 2). An electrolyte sealing structure of the cell frame 2 is formed by fixing the sealing member 5 with the adhesive 6, and thereby leakage of an electrolyte to the outside of the frame body 4 is suppressed.

The adhesive 6 is made of a soft material having a type A durometer hardness of 100 or less after curing. In this case, when the sealing member 5 is compressed by the adjacent member, it is easy for the adhesive 6 to deform in accordance with the deformation of the sealing member 5. Therefore, it is easy to suppress breakage, such as cracking, of the adhesive 6 due to the deformation of the sealing member 5; and it is easy to suppress detachment of the sealing member 5 from the adhesive 6 and detachment of the adhesive 6 from the sealing groove 48.

If the type A durometer hardness of the adhesive 6 after curing is larger than the type A durometer hardness of the sealing member 5, preferably, the difference between the type A durometer hardness of the adhesive 6 after curing and the type A durometer hardness of the sealing member 5 is as small as possible. In this case, it is easy for the adhesive 6 to deform in accordance with the deformation of the sealing member 5, and therefore it is easy to suppress damage to the adhesive 6 due to the deformation of the sealing member 5. The difference between the type A durometer hardness of the adhesive 6 after curing and the type A durometer hardness of the sealing member 5 is preferably 20 or less, more preferably 10 or less, and particularly preferably 5 or less.

The type A durometer hardness of the adhesive 6 after curing is preferably as small as possible, and particularly preferably, less than the type A durometer hardness of the sealing member 5. In this case, it is possible for the adhesive 6 to deform as easily as the sealing member 5 or to deform more easily than the sealing member 5, and therefore it is easier to suppress damage to the adhesive 6 due to the deformation of the sealing member 5. The type A durometer hardness of the adhesive 6 after curing is more preferably 90 or less, further preferably 70 or less and 60 or less, and particularly preferably 50 or less and 40 or less. Preferably, the type A durometer hardness of the adhesive 6 after curing is 20 or more, for practical uses.

Preferably, the material of the adhesive 6 is at least one material selected from a silicone resin adhesive, an epoxy resin adhesive, a polyurethane adhesive, an acrylic adhesive, a vinyl acetate adhesive, a vinyl chloride adhesive, and a latex adhesive. Among these, particularly preferably, the material of the adhesive 6 is at least one material selected from a silicone resin adhesive and an epoxy resin adhesive. Since each of a silicone resin adhesive and an epoxy resin adhesive has high electrolyte resistance, it is easy to suppress dissolving of the adhesive in the electrolyte and entry of the adhesive into the frame body as an impurity. Therefore, it is possible to suppress an increase in internal resistance and an increase in pressure loss due to adhesion of an impurity to the positive and negative electrodes 104 and 105 (FIG. 5), and thus it is easy to suppress decrease of battery performance.

Preferably, the material of the adhesive 6 is a material that cures (solidifies) at room temperature. In this case, compared with a thermosetting adhesive, the frame body 4 (the cell frame 2) is not affected by thermal hysteresis. Moreover, workability is high, compared with a thermoplastic adhesive. This is because it is not necessary to heat and melt the adhesive 6 in order to apply the adhesive 6 to the sealing groove 48 and it is not necessary to cool the adhesive 6 in order to cure the adhesive.

Preferably, the material of the adhesive 6 is a material that requires a certain length of time for curing (solidifying). For example, preferably, the curing (solidifying) time of the adhesive 6 is one minute or longer. In this case, the operation time is sufficiently long, and it is easy to perform an operation of fitting the sealing member 5 into the sealing groove 48 after applying the adhesive 6 to the sealing groove 48.

Preferably, the volume occupancy ratio of the adhesive 6 in the sealing groove 48 $\{(Vb/Vg)\times100\}\%$ is $\{(1-Vs/Vg)\times100\}\%$ or less, where Vg (mm$^3$) is the volume of the sealing groove 48, Vs (mm$^3$) is the volume of the sealing member 5, and Vb (mm$^3$) is the volume of the adhesive 6. When the volume occupancy ratio $\{(Vb/Vg)\times100\}\%$ is $\{(1-Vs/Vg)\times100\}\%$ or less, the proportion of the adhesive 6 is not excessively high, and therefore it is possible to suppress application of an excessive pressure to the adhesive 6 when the sealing member 5 is compressed. Therefore, it is easy to suppress compression breakage of the adhesive 6 after curing. Moreover, it is easy to prevent compression breakage of the sealing member 5 and rapid deterioration of the sealing member 5 due to excessive compression. Furthermore, it is also possible to suppress application of an excessive pressure to the sealing groove 48 when the sealing member 5 is compressed, and therefore it is also easy to prevent compression breakage of the sealing groove 48 itself. The volume occupancy ratio $\{(Vb/Vg)\times100\}\%$ is more preferably $\{(1-Vs/Vg)\times90\}\%$ or less, and particularly preferably $\{(1-Vs/Vg)\times80\}\%$ or less.

Preferably, the volume occupancy ratio $\{(Vb/Vg)\times100\}\%$ is $\{(1-Vs/Vg)\times50\}\%$ or more. When the volume occupancy ratio $\{(Vb/Vg)\times100\}\%$ is $\{(1-Vs/Vg)\times50\}\%$ or more, the proportion of the adhesive 6 is high, and therefore it is easy to fix the sealing member 5 along the entire length of the sealing groove 48. Therefore, it is easier to prevent leakage of an electrolyte along the entire length of the frame body 4. The volume occupancy ratio $\{(Vb/Vg)\times100\}\%$ is more preferably $\{(1-Vs/Vg)\times60\}\%$ or more, and particularly preferably $\{(1-Vs/Vg)\times70\}\%$ or more.

When the adhesive 6 is not formed along the entire periphery of the sealing groove 48, preferably, the volume occupancy ratio $\{(Vb/Vg)\times100\}\%$ is the aforementioned lower limit or more or is the aforementioned upper limit or less in at least one of portions where the adhesive 6 is formed, and more preferably, is the lower limit or more or is the upper limit or less in all of the portions where the adhesive 6 is formed.

When the adhesive 6 is formed along the entire length of the sealing groove 48 and the volume occupancy ratio $\{(Vb/Vg)\times100\}\%$ is not uniform, preferably, the average of the volume occupancy ratio $\{(Vb/Vg)\times100\}\%$ along the entire length of the sealing groove 48 is the lower limit or more or is the upper limit or less. When the adhesive 6 is not formed along the entire length of the sealing groove 48 and the volume occupancy ratio $\{(Vb/Vg)\times100\}\%$ is not uniform in each of portions where the adhesive 6 is formed, preferably, the average of the volume occupancy ratio $\{(Vb/Vg)\times100\}\%$ in at least one of the portions where the adhesive 6 is formed is the lower limit or more or is the upper limit or less, and more preferably, the average of the volume occupancy ratio $\{(Vb/Vg)\times100\}\%$ in each of the portions where the adhesive 6 is formed is in the aforementioned range.

The adhesive 6 may be formed in at least one portion of the entire length of the sealing groove 48. The larger the number of portions where the adhesive 6 is formed, the easier it is to prevent coming off of the sealing member 5 from the sealing groove 48. When forming the adhesive 6 in a plurality of portions of the entire length of the sealing groove 48, preferably, the portions where the adhesive 6 is formed are at least one of opposite positions and diagonal positions in the sealing groove 48. The portions where the adhesive 6 is formed may be at least (1) the four curved portions 48C, (2) the pair of long linear portions 48L, or (3) the pair of short linear portions 48S. The adhesive 6 may be disposed in a plurality of separate portions in each of (1) the four curved portions 48C, (2) the pair of long linear portions 48L, or (3) the pair of short linear portions 48S, or may be continuously formed along the entire length of each of these. In order to prevent coming off of the sealing member 5 from the sealing groove 48, it is effective to form the adhesive 6 in at least the four curved portions 48C. This is because the sealing member 5 comes off more easily from the curved portions 48C than from the long linear portions 48L or the short linear portions 48S. The adhesive 6 is preferably formed in portions in two or more patterns selected from (1) the four curved portions 48C, (2) the pair of long linear portions 48L, and (3) the pair of short linear portions 48S, and more preferably in portions of all three patterns of (1) to (3). By forming the adhesive 6 in all of three patterns of (1) to (3), it is possible to fix the sealing member 5 to the sealing groove 48 in each of the pieces 41, 42, and 43, and therefore it is more effective in preventing coming off of the sealing member 5 from the sealing groove 48.

When the adhesive 6 is disposed in a plurality of separate portions in the portions 48C, 48L, and 48S, the length of each part of the adhesive 6 in the longitudinal direction of the sealing groove 48 may be appropriately selected. That is, each part of the adhesive 6 has a linear shape or a dot-like shape. In either case, preferably, the distance between adjacent parts of the adhesive 6 in the longitudinal direction of the sealing groove 48 is a distance that can prevent coming off of the sealing member 5 and can prevent the operation of applying the adhesive 6 from becoming too cumbersome.

The distance between adjacent parts of the adhesive 6 in the longitudinal direction of the sealing groove 48 may be regular along the entire length of the sealing groove 48 or may be regular in each of the portions 48C, 48L, and 48S. The distance between adjacent parts of the adhesive 6 in each of the portions 48C, 48L, and 48S in the longitudinal direction of the sealing groove 48 may be unequal to the distance between parts of the adhesive 6 that are adjacent to each other in the curved portion 48C and the long (short) straight line portion 48L (48S) in the longitudinal direction of the sealing groove 48.

The adhesive 6 may be disposed continuously along the entire length of the sealing groove 48. In this case, the sealing member 5 can be fixed along the entire length of the sealing groove 48, and therefore it is particularly effective in preventing coming off of the sealing member 5 from the sealing groove 48. Moreover, because the adhesive 6 is formed along the entire length of the sealing groove 48, it is possible to seal an electrolyte also with the adhesive along the entire length of the sealing groove 48, and therefore it is possible to increase electrolyte sealability.

Here, the adhesive 6 is formed in all of the long linear portions 48L, the short linear portions 48S, and the curved portions 48C. The distance between adjacent parts of the adhesive 6 in the longitudinal direction of the sealing groove 48 is regular in each of the portions 48C, 48L, and 48S.

[Others]

In the liquid-supply-side piece 41, liquid-supply guide grooves 46, which extend between the liquid supply manifolds 44 and the bipolar plate 3 and which guide an electrolyte from the liquid supply manifolds 44 to the bipolar plate 3, are formed (FIG. 1). Likewise, in the liquid-discharge-side piece 42, liquid-discharge guide grooves 47, which extend between the liquid discharge manifolds 45 and the bipolar plate 3 and which guide the electrolyte from the bipolar plate 3 to the liquid discharge manifolds 45, are formed. Both of the guide grooves 46 and 47 are covered by plastic protective plates (not shown) when forming the layered body. Thus, the electrolyte flows between the manifolds 44 and 45 and the bipolar plate 3 without leaking from both of the guide grooves 46 and 47.

Preferably, manifold sealing grooves 44a and 45a (FIG. 1), into which sealing members (not shown) are fitted, are formed in the outer peripheries of the liquid supply manifolds 44 and the liquid discharge manifolds 45, which supply an electrolyte to and discharge the electrolyte from the second surface of the frame body 4 (on the back side of the sheet of FIG. 1). Preferably, the sealing members that are fitted into the manifold sealing grooves 44a and 45a are fixed to the manifold sealing grooves 44a and 45a by using an adhesive (not shown) that is similar to the adhesive 6 described above, which fixes the sealing member 5 to the sealing groove 48. In this case, it is possible to suppress leakage of the electrolyte from each of the manifolds 44 and 45.

Advantageous Effects

The RF battery according to the first embodiment has the following advantages.

(1) It is easy to form an electrolyte sealing structure. This is because, since the sealing member 5 can be fixed to the sealing groove 48 with the adhesive 6, even when an O-ring, which is a soft and long strip whose shape is not definite, is used as the sealing member 5, it is easy to suppress coming off of the sealing member 5, which is fitted into the sealing groove 48, from the sealing groove 48.

(2) Electrolyte sealability is high. Before curing, the adhesive has high fluidity, because the adhesive after curing has a type A durometer hardness of 100 or less and is soft. Therefore, when the adhesive 6 before curing is applied to the sealing groove 48 and the sealing member 5 is made to contact the adhesive 6 before curing, it is easy for the adhesive 6 to flow so that a gap may not be formed between the inside of the sealing groove 48 and the sealing member 5. Thus, it is easy to suppress forming of a gap that extends through the adhesive 6 from the inside of the frame body 4 to the outside of the frame body 4, which may occur due to contact between the adhesive 6 and the sealing member 5. Accordingly, it is possible to suppress leakage of the electrolyte from the gap to the outside of the frame body 4. The adhesive 6 after curing has a type A durometer hardness of 100 or less and is soft. Therefore, when the cell frames 2 are stacked after curing the adhesive 6 and thereby fixing the sealing member 5 to the sealing groove 48, even if the sealing member 5 deforms by being compressed by an adjacent cell frame or a sealing member of the adjacent cell frame, the adhesive 6 after curing can deform in accordance with the deformation of the sealing member 5. Thus, it is easy to suppress damage to the adhesive 6 due to the deformation of the sealing member 5, and it is easy to suppress detachment of the sealing member 5 from the adhesive 6 and detachment of the adhesive 6 from the sealing groove 48. Accordingly, it is easy to suppress coming off of the sealing member 5 from the sealing groove 48, and therefore it is possible to suppress leakage of an electrolyte to the outside of the frame body 4. The adhesive 6 can have a function of sealing the electrolyte since damage to the adhesive 6 can be suppressed in this way, and therefore it is easy to increase electrolyte sealability.

Example 1

Figure 3:
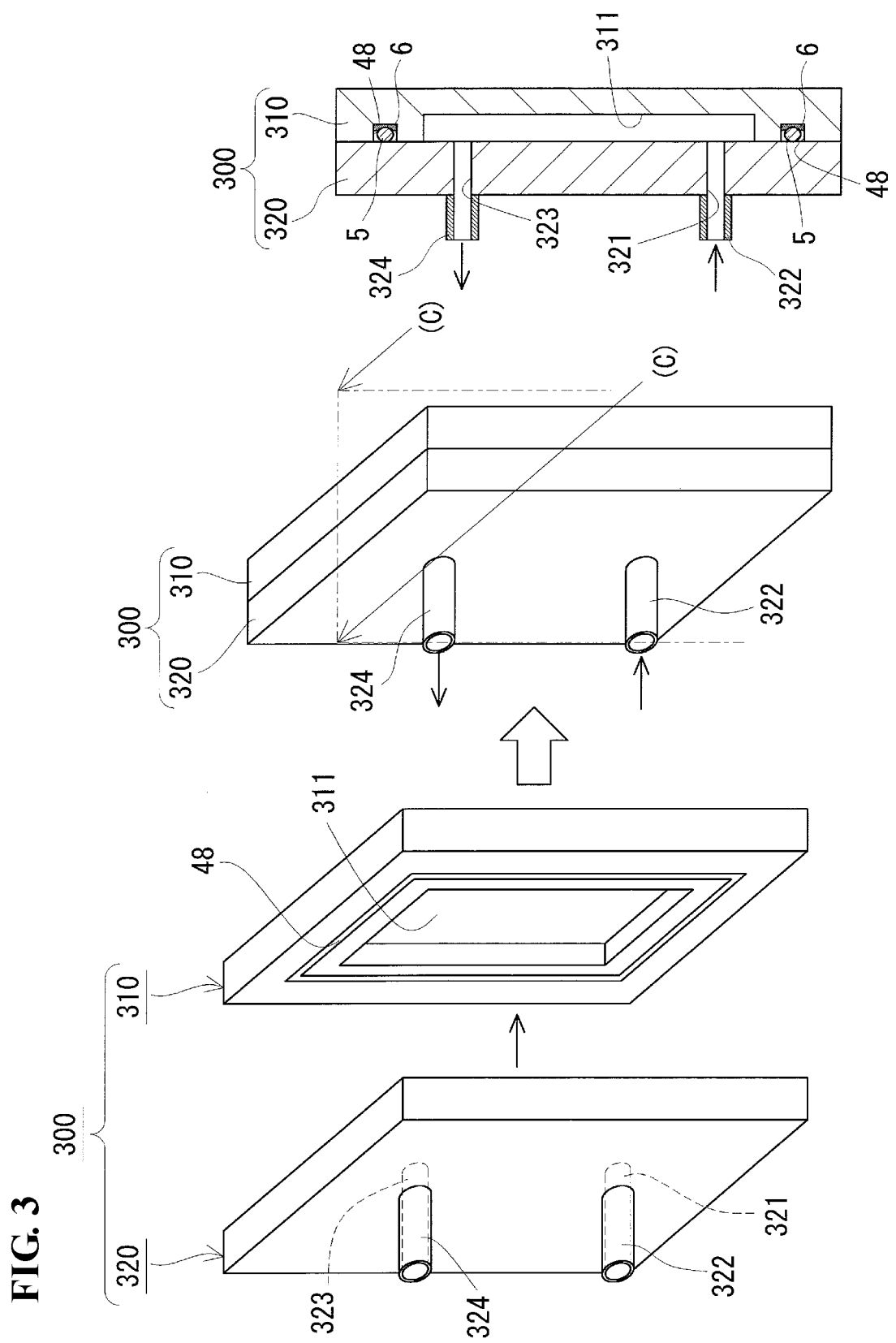
FIG. 3 is a schematic view of a liquid-leakage-testing jig used in Example 1.

By using a liquid-leakage-testing jig 300 illustrated in FIG. 3, difference in the leakage amount of water due to the presence or absence of an adhesive 6, which fixes a sealing member 5 to a sealing groove 48, was examined. For convenience of detecting the difference in the leakage amount of water, the liquid-leakage-testing jig 300 is formed so as to leak water more easily than the cell stack 200 (see FIG. 5) of a general RF battery.

[Sample No. 1-1]

[Liquid-Leakage-Testing Jig]

A liquid-leakage-testing jig 300 of sample No. 1-1 includes a cell-frame-corresponding member 310, a supply/discharge-plate-corresponding member 320, a sealing member 5 (shown in the sectional view in a right part of FIG. 3), and an adhesive 6. The liquid-leakage-testing jig 300 of sample No. 1-1 was formed by fixing the sealing member 5 to a sealing groove 48 of the cell-frame-corresponding member 310 with the adhesive 6 and stacking the supply/discharge-plate-corresponding member 320 on the cell-frame-corresponding member 310.

(Cell-Frame-Corresponding Member)

The cell-frame-corresponding member 310 is member that emulates the cell frame 2 described in the first embodiment. Here, the cell-frame-corresponding member 310 is made from a transparent rectangular plate. A rectangular recess 311 is formed at the center of a surface of the cell-frame-corresponding member 310 facing the supply/discharge-plate-corresponding member 320, and the sealing groove 48, which has a single ring shape, is formed in the outer periphery of the recess 311 so as to surround the recess 311 along the outer shape of the cell-frame-corresponding member 310. The sealing member 5 is fitted into the sealing groove 48.

(Supply/Discharge-Plate-Corresponding Member)

The supply/discharge-plate-corresponding member 320 is a member that emulates the supply/discharge plate 201 (see FIG. 5), which supplies and discharges the positive and negative electrolytes between the battery cell 100 and the positive and negative electrolytes tanks 106 and 107 (see FIG. 4) in the RF battery. Here, the supply/discharge-plate-corresponding member 320 is made from a transparent rectangular flat plate. The supply/discharge-plate-corresponding member 320 has the same size as the cell-frame-corresponding member 310. The supply/discharge-plate-corresponding member 320 supplies water to the recess 311 of the cell-frame-corresponding member 310 and discharges the water from the recess 311. At positions in the supply/discharge-plate-corresponding member 320 corresponding to the recess 311 of the cell-frame-corresponding member 310, a supply hole 321 for supplying water to the recess 311 and a discharge hole 323 for discharging the water from the recess 311 are formed so as to extend from the front side to the back side thereof. On a surface of the supply/discharge-plate-corresponding member 320 opposite to the cell-frame-corresponding member 310, a supply pipe 322 and a discharge pipe 324, which are attached to the supply hole 321 and the discharge hole 323, are disposed. Water is supplied from the supply pipe 322 to the recess 311 via the supply hole 321, and the water supplied to the recess 311 is discharged from the discharge hole 323 to the outside of the liquid-leakage-testing jig 300 via the discharge pipe 324.

(Sealing Member)

The sealing member 5 is fitted into the sealing groove 48 and suppresses leakage of water from the interface between the cell-frame-corresponding member 310 and the supply/discharge-plate-corresponding member 320 to the outside of the liquid-leakage-testing jig 300. Here, an O-ring having a type A durometer hardness of 70 was used as the sealing member 5.

(Adhesive)

The adhesive 6 fixes the sealing member 5 to the sealing groove 48. Here, a silicone adhesive having a type A durometer hardness of 60 after curing (silicone sealant KE-40RTV, made by Shin-Etsu Chemical Co., Ltd.) was used as the adhesive 6. The volume occupancy ratio $\{(Vb/Vg) \times 100\}\%$ of the adhesive 6 in the sealing groove 48 was $\{(1-Vs/Vg) \times 50\}\%$.

[Sample No. 1-2]

A liquid-leakage-testing jig 300 of sample No. 1-2 was the same as that of sample No. 1-1 except that a silicone adhesive having a type A durometer hardness of 28 after curing (silicone sealant KE-42, made by Shin-Etsu Chemical Co., Ltd.) was used as the adhesive 6, and the volume occupancy ratio $\{(Vb/Vg) \times 100\}\%$ of the adhesive 6 used for fixing in the sealing groove 48 was $\{(1-Vb/Vg) \times 70\}\%$.

[Sample No. 1-100]

A liquid-leakage-testing jig 300 of sample No. 1-100 was the same as that of sample No. 1-1 except that an adhesive for fixing the sealing member 5 to the sealing groove 48 was not used. That is, the sealing member 5 of the liquid-leakage-testing jig 300 in sample No. 1-100 was only fitted into the sealing groove 48.

[Liquid Leakage Test]

Difference in the leakage amount of water between the liquid-leakage-testing jigs 300 of the samples was evaluated as follows. Water was supplied from the supply pipe 322 to the recess 311 via the supply hole 321, and the water supplied to the recess 311 was discharged from the recess 311 to the outside of the liquid-leakage-testing jig 300 from the discharge hole 323 via the discharge pipe 324. At this time, the amount of water that leaked from the interface between the cell-frame-corresponding member 310 and the supply/discharge-plate-corresponding member 320 to the outside of the liquid-leakage-testing jig 300 was measured.

The leakage amount of water of the liquid-leakage-testing jig 300 of sample No. 1-1 was less than that of the liquid-leakage-testing jig 300 of sample No. 1-100. Accordingly, it can be understood that, by fixing the sealing member 5 to the sealing groove 48 by using the adhesive, 6, which has a low hardness after curing, water sealability is improved as compared with a case where the adhesive 6 is not used.

The leakage amount of water of the liquid-leakage-testing jig 300 of sample No. 1-2 was further less than that of the liquid-leakage-testing jig 300 of sample No. 1-1. Accordingly, it can be understood that water sealability is further improved by using an adhesive having a lower type A durometer hardness after curing and setting the volume occupancy ratio $\{(Vb/Vg) \times 100\}\%$ of the adhesive 6 in the sealing groove 48 to be $\{(1-Vb/Vg) \times 70\}\%$.

Example 2

By using the cell frame 2 described with reference to FIGS. 1 and 2, a cell stack similar to the cell stack 200 described with reference to FIG. 5 was assembled. After charging and discharging by causing electrolytes to flow therethrough, the cell stack was disassembled and the state in which the sealing member 5 was fixed to the sealing groove 48 was examined.

The cell stack was assembled by stacking the plurality of cell frames 2. Here, the number of cells was five. The plurality of cell frames 2 were stacked after applying the adhesive 6 to the sealing groove 48 of each of the cell frames 2, fitting the sealing member 5 into the sealing groove 48, and fixing the sealing member 5 to the sealing groove 48 by curing the adhesive 6. As the sealing member 5 and the adhesive 6, a sealing member and an adhesive being the same as those of sample No. 1-1 of Example 1 were used, and the volume occupancy ratio of the adhesive 6 was the same as that of sample No. 1-1 of Example 1.

The cell stack was disassembled after charging and discharging, and the sealing groove 48 of the cell frame 2 was visually inspected. The sealing member 5 did not come off the sealing groove 48 and was securely fixed with the adhesive 6. Accordingly, it can be understood that coming off of the sealing member 5 from the sealing groove 48 can be suppressed by fixing the sealing member 5 to the sealing groove 48 with the adhesive 6, which has a low hardness after curing.

Example 3

A cell stack was assembled in the same way as in Example 2, except that a sealing member and an adhesive being the same as those of sample No. 1-2 of Example 1 were used as the sealing member 5 and the adhesive 6 and the volume occupancy ratio of the adhesive 6 was the same as that of sample No. 1-1 of Example 1. In the same way as in Example 2, after charging and discharging by causing electrolytes to flow therethrough, the cell stack was disassembled and the state in which the sealing member 5 was fixed to the sealing groove 48 was visually examined. The sealing member 5 did not come off the sealing groove 48 and was securely fixed with the adhesive 6. Accordingly, also in Example 3, it can be understood that coming off of the sealing member 5 from the sealing groove 48 can be suppressed.

REFERENCE NUMERALS 1 redox flow (RF) battery
2 cell frame
3 bipolar plate
4 frame body
41 liquid-supply-side piece
42 liquid-discharge-side piece
43 coupling piece
44 liquid supply manifold
45 liquid discharge manifold
44a, 45a manifold sealing groove
46 liquid-supply guide groove
47 liquid-discharge guide groove
48 sealing groove
48L long linear portion
48S short linear portion
48C curved portion
5 sealing member
6 adhesive
100 battery cell
101 membrane
102 positive electrode cell
103 negative electrode cell
104 positive electrode
105 negative electrode
106 positive electrolyte tank
107 negative electrolyte tank
108, 109 supply conduit
110, 111 discharge conduit
112, 113 pump
120 cell frame
121 bipolar plate
122 frame body
131, 132 liquid supply manifold
133, 134 liquid discharge manifold
135, 136 liquid-supply guide groove
137, 138 liquid-discharge guide groove
140 sealing member
200 cell stack
201 supply/discharge plate
210, 220 end plate
300 liquid-leakage-testing jig
310 cell-frame-corresponding member
311 recess
320 supply/discharge-plate-corresponding member
321 supply hole
322 supply pipe
323 discharge hole
324 discharge pipe

The invention claimed is:

1. A redox flow battery comprising a cell frame having a frame body in which a sealing groove is formed and a sealing member disposed in the sealing groove,
wherein the redox flow battery comprises an adhesive that fixes the sealing member to the sealing groove,
wherein a type A durometer hardness of the adhesive after curing is 100 or less, and
wherein a volume occupancy ratio $\{(Vb/Vg)\times 100\}\%$ of the adhesive in the sealing groove is $\{(1-Vs/Vg)\times 50\}\%$ or more and $\{(1-Vs/Vg)\times 100\}\%$ or less,
where Vg (mm$^3$) is a volume of the sealing groove, Vs (mm$^3$) is a volume of the sealing member, and Vb (mm$^3$) is a volume of the adhesive.

2. The redox flow battery according to claim 1, wherein the type A durometer hardness of the adhesive after curing is less than or equal to a type A durometer hardness of the sealing member.

3. The redox flow battery according to claim 1, wherein a material of the adhesive is at least one material selected from a silicone resin adhesive, an epoxy resin adhesive, a polyurethane adhesive, an acrylic adhesive, a vinyl acetate adhesive, a vinyl chloride adhesive, and a latex adhesive.

4. The redox flow battery according to claim 1, wherein the type A durometer hardness of the adhesive after curing is less than a type A durometer hardness of the sealing member.

5. The redox flow battery according to claim 1, wherein the type A durometer hardness of the adhesive after curing is 90 or less.

6. The redox flow battery according to claim 4, wherein the type A durometer hardness of the adhesive after curing is 90 or less.

7. The redox flow battery according to claim 1, wherein the sealing groove is composed of long linear portions, short linear portions, and curved portions, and wherein the adhesive is formed in a least the curved portions.

8. A redox flow battery comprising a cell frame having a frame body in which a sealing groove is formed and a sealing member disposed in the sealing groove,
wherein the redox flow battery comprises an adhesive that fixes the sealing member to the sealing groove,
wherein a type A durometer hardness of the adhesive after curing is 100 or less,
wherein the adhesive is discontinuously disposed along a length of the sealing groove with a separation between adjacent parts of the adhesive,
wherein the sealing groove is composed of a pair of long linear portions, a pair of short linear portions, and four curved portions, and
wherein the adhesive is formed in at least the four curved portions but not in the pair of short linear portions.

9. A redox flow battery comprising a cell frame having a frame body in which a sealing groove is formed and a sealing member disposed in the sealing groove,
wherein the redox flow battery comprises an adhesive that fixes the sealing member to the sealing groove,
wherein a type A durometer hardness of the adhesive after curing is 100 or less,
wherein the adhesive is discontinuously disposed along a length of the sealing groove with a separation between adjacent parts of the adhesive,
wherein the sealing groove is composed of a pair of long linear portions, a pair of short linear portions, and four curved portions, and
wherein the adhesive is formed in at least the four curved portions but not in the pair of long linear portions.

* * * * *